United States Patent
Sakuma

(10) Patent No.: US 6,847,628 B1
(45) Date of Patent: Jan. 25, 2005

(54) HIGH THROUGHPUT TDMA/TDD DIVERSITY COMMUNICATION BY ASSEMBLING TIME SLOTS INTO DOWNLINK BURST GROUPS CORRESPONDING TO SELECTED ANTENNAS

(75) Inventor: Shigeru Sakuma, Tokyo (JP)

(73) Assignee: NEC Corporation, Tokyo (JP)

( * ) Notice: Subject to any disclaimer, the term of this patent is extended or adjusted under 35 U.S.C. 154(b) by 964 days.

(21) Appl. No.: 09/590,082

(22) Filed: Jun. 9, 2000

(30) Foreign Application Priority Data

Jun. 10, 1999  (JP) ............................................ 11-163256

(51) Int. Cl.[7] .............................................. H04B 7/212
(52) U.S. Cl. ..................................... 370/347; 370/474
(58) Field of Search ................................ 370/294, 321, 370/332, 347, 468, 474; 375/346, 347

(56) References Cited

U.S. PATENT DOCUMENTS

| | | | | |
|---|---|---|---|---|
| 5,696,798 A | * | 12/1997 | Wright et al. | ................ 375/345 |
| 5,822,313 A | * | 10/1998 | Malek et al. | ................ 370/332 |
| 6,032,033 A | * | 2/2000 | Morris et al. | ............ 455/277.2 |

FOREIGN PATENT DOCUMENTS

| | | | | |
|---|---|---|---|---|
| FI | WO 96/08089 | * | 3/1996 | ............ H04B/7/08 |
| JP | 10-51365 | | 2/1998 | |
| SE | WO 96/02984 | * | 2/1996 | ............ H04B/7/08 |

* cited by examiner

Primary Examiner—Huy D. Vu
Assistant Examiner—Toan D. Nguyen
(74) Attorney, Agent, or Firm—Sughrue Mion, PLLC

(57) ABSTRACT

In a TDMA/TDD communication system, uplink RF bursts are received by a number of antennas. Each RF burst contains TDMA signals identified by mobile-terminal identifiers. From each RF burst, the strength of the TDMA signals are detected and compared with the strengths of other RF bursts. For each mobile-terminal identifier, one antenna is selected as a best antenna with the highest strength, and a unique relationship is established in a memory between the selected antenna and the mobile-terminal identifier. A downlink TDM signal is disassembled into time slot signals, which are assembled, according to the relationships established in the memory, into N multicast burst groups. N is equal to the number of antennas selected during the uplink interval. An overhead is inserted to a header portion of each burst group. Overhead-inserted burst groups are converted into RF bursts during a downlink interval of the frame and are transmitted.

9 Claims, 4 Drawing Sheets

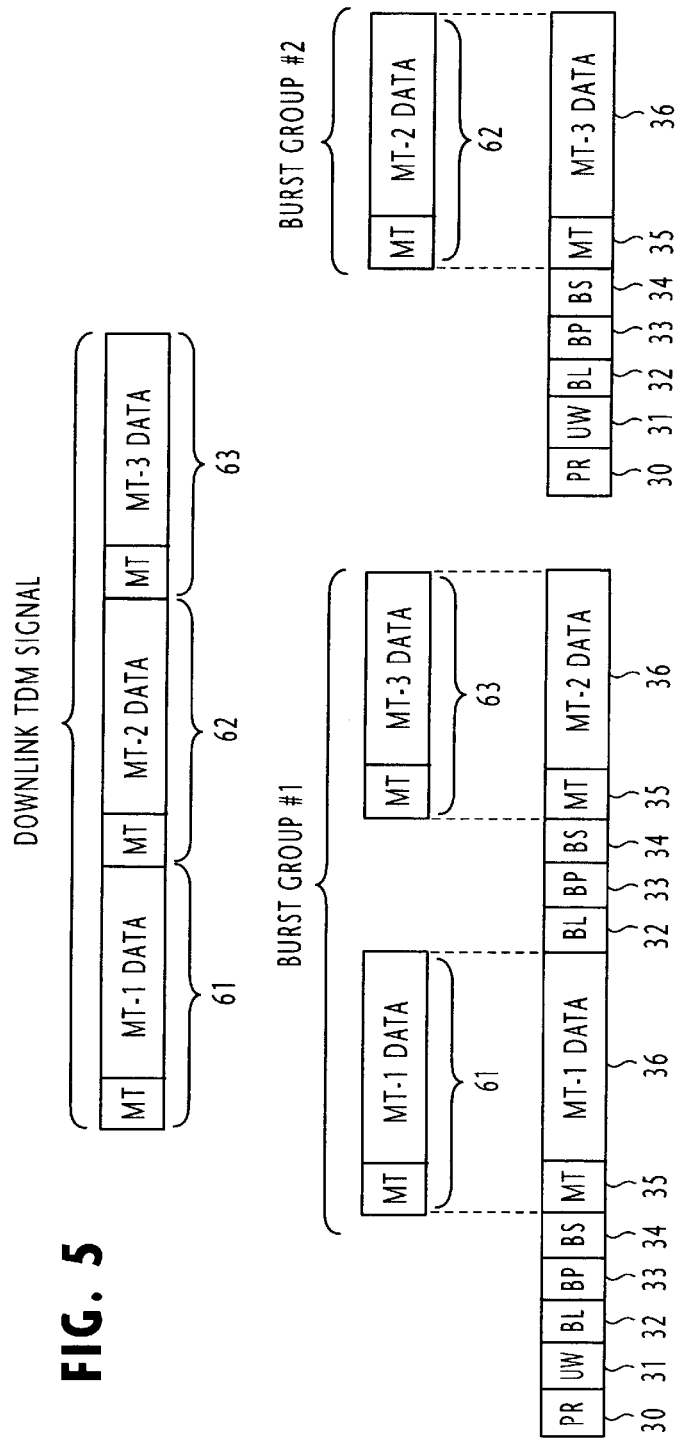

HIGH THROUGHPUT TDMA/TDD DIVERSITY COMMUNICATION BY ASSEMBLING TIME SLOTS INTO DOWNLINK BURST GROUPS CORRESPONDING TO SELECTED ANTENNAS

BACKGROUND OF THE INVENTION

1. Field of the Invention

The present invention relates generally to diversity communication systems, and more specifically to a time division multiple access/time division duplex (TDMA/TDD) communication system that utilises the transmit diversity of the system by the transmission of bursts from best antennas selected according to the strengths of received signals.

2. Description of the Related Art

Digital radio communication systems of TDMA/TDD mode are currently employed for mobile cellular networks such as the Personal Handyphone Systems (PHS) and are standardised as the Digital European Cordless Telecommunication (DECT). Since this mode of transmission employs only one frequency for both transmission and reception, the mobile terminal is provided with a transmit/receive switch, instead of a costly antenna duplexer.

It is known that because of the high-speed mode switching between transmission and reception relative to the rate of occurrence of multipath fading, there is a high degree of correlation between a downlink propagation path and an uplink propagation path. If a cell-site base station uses a number of space diversity antennas, a best antenna for the reception of an uplink signal from a given mobile terminal is also the best for the transmission of a downlink signal to the given mobile terminal. This mode of communication takes advantage of diversity reception of signals and is called "transmit/receive diversity". One example of known transmit/receive diversity mode communication systems is shown and described in Japanese Laid-Open Patent Application No. 10-51365.

In the current TDMA/TDD system, it is required that downlink RF bursts transmitted to mobile terminals during a first half interval of a frame must be in a one-to-one correspondence to uplink RF bursts received from the mobile terminals during a second half interval of a frame and that each burst must be sent and received on time slots assigned to each mobile terminal. Further, RF bursts must be sufficiently spaced apart by "guard times" to accommodate possible variability of propagation delays due to different propagation path lengths. Additionally, each RF burst must include header information such as a preamble and a unique word for establishing bit and frame synchronisation.

It is thus inefficient in terms of channel utilization. This is particularly true of the transmit/receive diversity system in which a number of downlink RF bursts are transmitted in sequence from one selected antenna.

SUMMARY OF THE INVENTION

It is therefore an object of the present invention to provide a high throughput TDMA/TDD diversity communication system and a method for implementing the diversity communication system.

According to a first aspect of the present invention, there is provided a method of time division multiple access/time division duplex (TDMA/TDD) communication method comprising the steps of (a) using a plurality of space diversity antennas during an uplink interval of a frame to receive a plurality of RF bursts each containing a series of TDMA signals respectively identified by mobile-terminal identifiers, (b) detecting, from each RF burst, the respective strength values of the TDMA signals, (c) comparing the respective strength values of each RF burst with the corresponding strength values of other RF bursts, (d) selecting, for each mobile-terminal identifier, one of the antennas from which the TDMA signal of highest strength value is received and establishing a unique relationship between the selected antenna and the mobile-terminal identifier in a memory, (e) disassembling a downlink TDM signal into a plurality of time-slot signals and assembling the time-slot signals # 1 into N burst groups each containing at least one time-slot signal according to unique relationships established in the memory, where the integer N is equal to the number of antennas selected by step (d) during the uplink interval, (f) appending an overhead to a header portion of each of the burst groups, and (g) converting the N burst groups into downlink RF bursts during a downlink interval of the frame and transmitting the RF bursts from the antennas respectively selected by step (d).

According to a second aspect, the present invention provides a time division multiple access/time division duplex (TDMA/TDD) communication system comprising a plurality of space diversity antennas, a plurality of transmit/receive switches connected to the antennas for alternately operating the system in a receive mode during an uplink interval of a frame and in a transmit mode during a downlink interval of the frame, and a plurality of RF receiving circuits associated with the plurality of transmit/receive switches for receiving a plurality of uplink RF bursts each containing a series of TDMA signals respectively identified by mobile-terminal identifiers and producing a plurality of strength indication signals representing the respective strength values of the TDMA signals of each uplink RF burst. Receive diversity circuitry is provided for comparing the respective strength-values of each RF burst with the corresponding strength values of other RF bursts and selecting, for each mobile-terminal identifier, one of the antennas from which the TDMA signal of highest strength value is received. Transmit diversity circuitry, having a memory, establishes the memory, a unique relationship between the selected antenna and each of the mobile-terminal identifiers, disassembles a downlink TDM signal into a plurality of time-slot signals and assembles the time-slot signals into N burst groups each containing at least one time-slot signal according to relationships established in said memory, and appends an overhead to a header portion of each of the N burst groups, where the integer N is equal to the number of antennas selected by the receive diversity circuitry during said uplink interval. RF transmitting circuitry converts the N burst groups into downlink RF bursts and transmits the RF bursts respectively from the antennas selected by the receive diversity circuitry.

BRIEF DESCRIPTION OF THE DRAWINGS

The present invention will be described in further detail with reference to the accompanying drawings, in which:

FIG. 4 shows contents of the mapping table memory of FIG. 1 establishing relationships between the two antennas and the three mobile terminals; and FIG. 5 is an illustration of a process of disassembling a received downlink TDM signal and formulating burst groups with disassembled time slot signals according to the contents of the memory of FIG. 4.

DETAILED DESCRIPTION

Figure 1:
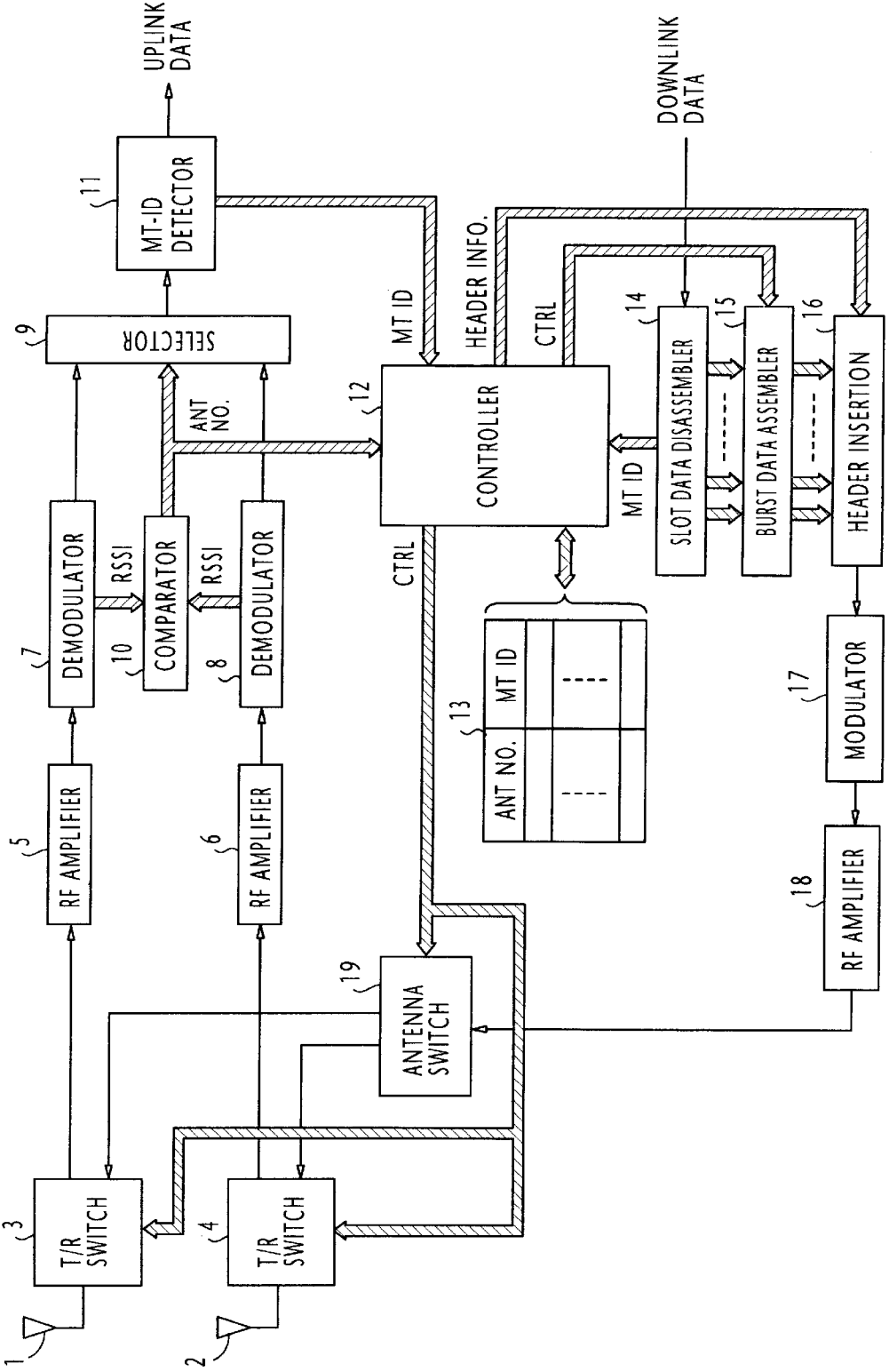
FIG. 1 is a block diagram of a TDMA/TDD cell-site base station according to the present invention.

Referring now to FIG. 1, there is shown a cell-site base station of TDMA/TDD (time division multiple access/time division duplex) mobile communication system according to the present invention. The base station includes a plurality of space diversity antennas and a plurality of transmit/receive switches respectively connected to the antennas. For the sake of simplicity, only two antennas 1 and 2 and switches 3 and 4 are illustrated. Each of the transmit/receive switches 3 and 4 is controlled to operate the base station in a receive mode during an uplink burst interval of a frame and in a transmit mode during a downlink burst interval of the frame. When the base station is in a receive mode, the space diversity antennas 1 and 2 are coupled to RF amplifiers 5 and 6, respectively, for receiving uplink RF bursts propagated over different paths from mobile terminals are received and amplified.

Each of the amplified RF bursts contains a series of baseband TDMA signals identified respectively by mobile-terminal identifiers. The amplified RF bursts are converted by demodulators 7 and 8 to the baseband TDMA signals each containing the identifier of a mobile terminal. Further, each demodulator produces a received signal strength indication (RSSI) signal which indicates the strength of each TDMA signal. For each mobile terminal, two baseband signals and corresponding RSSI signals are produced by demodulators 7 and 8. One of these baseband signals is selected by a selector 9 according to a signal from a comparator 10. For each mobile terminal, the comparator 10 provides comparison between the two RSSI signals and produces a signal that identifies the antenna from which the signal of highest strength is received. According to the output of the comparator 10, the highest signal is selected and supplied from the selector 9 to a detector 11 where a copy of the mobile-terminal identifier (MT ID) is extracted from the selected baseband signal. The selected baseband signal will be sent as uplink data to a base station controller, not shown.

A controller 12 is provided for receiving the output signal of the comparator 10 that indicates the selected antenna number and the mobile terminal identifier extracted by detector 11. A mapping table memory 13 is provided for establishing unique relationships between antenna numbers and MT identifiers under control of the controller 12. Thus, each entry of the memory 13 indicates which antenna was the best for receiving an uplink signal from a mobile terminal. Because of the short time interval of time division duplex mode between reception and transmission of bursts, there is a high degree of correlation between the best antenna for reception and the best antenna for transmission.

Downlink TDM data, supplied from the base station controller, is disassembled into time slot signals by a slot data disassembler 14 and the disassembled signals are fed to a burst data assembler 15.

A destination MT identifier is detected from each of the disassembled time slot signals and supplied to the controller 12. For a given destination mobile terminal, the controller 12 uses a corresponding MT identifier from the disassembler 14 to address the mapping table memory 13 and reads an antenna number from a corresponding entry. The antenna of this number is selected as the best one for transmission of a downlink burst to the given mobile terminal.

According to the relationships established in the memory 13 between the antenna numbers and the MT identifiers, the controller 12 controls the burst data assembler 15 to assemble the disassembled signals into N burst groups each containing at least one time slot signal, where the integer N is equal to the number of antennas selected from the mapping memory 13 as 4 best antennas for transmission of downlink bursts.

A header insertion circuit 16 is connected to the burst data assembler 15 to append overhead information supplied from the controller 12 into the header of each of the assembled burst signals. The overhead information 18 includes a preamble for establishing bit timing synchronisation, a unique word for establishing frame timing synchronisation, and data indicating the structure of the frame such as the data length of each downlink channel signal destined for each mobile terminal and the boundary point between the downlink and uplink burst intervals of the frame. A mobile terminal identifier (source and destination terminal identifications) is also inserted into each of the assembled downlink channel signals.

The header-containing downlink burst signals are then serially delivered from the header insertion circuit 16 to a modulator 17 where the signals are converted to downlink RF bursts. The downlink RF bursts are amplified by an RF power amplifier 18 and supplied through an antenna switch 19 to one of the transmit/receive switches 3 and 4.

Figure 2:
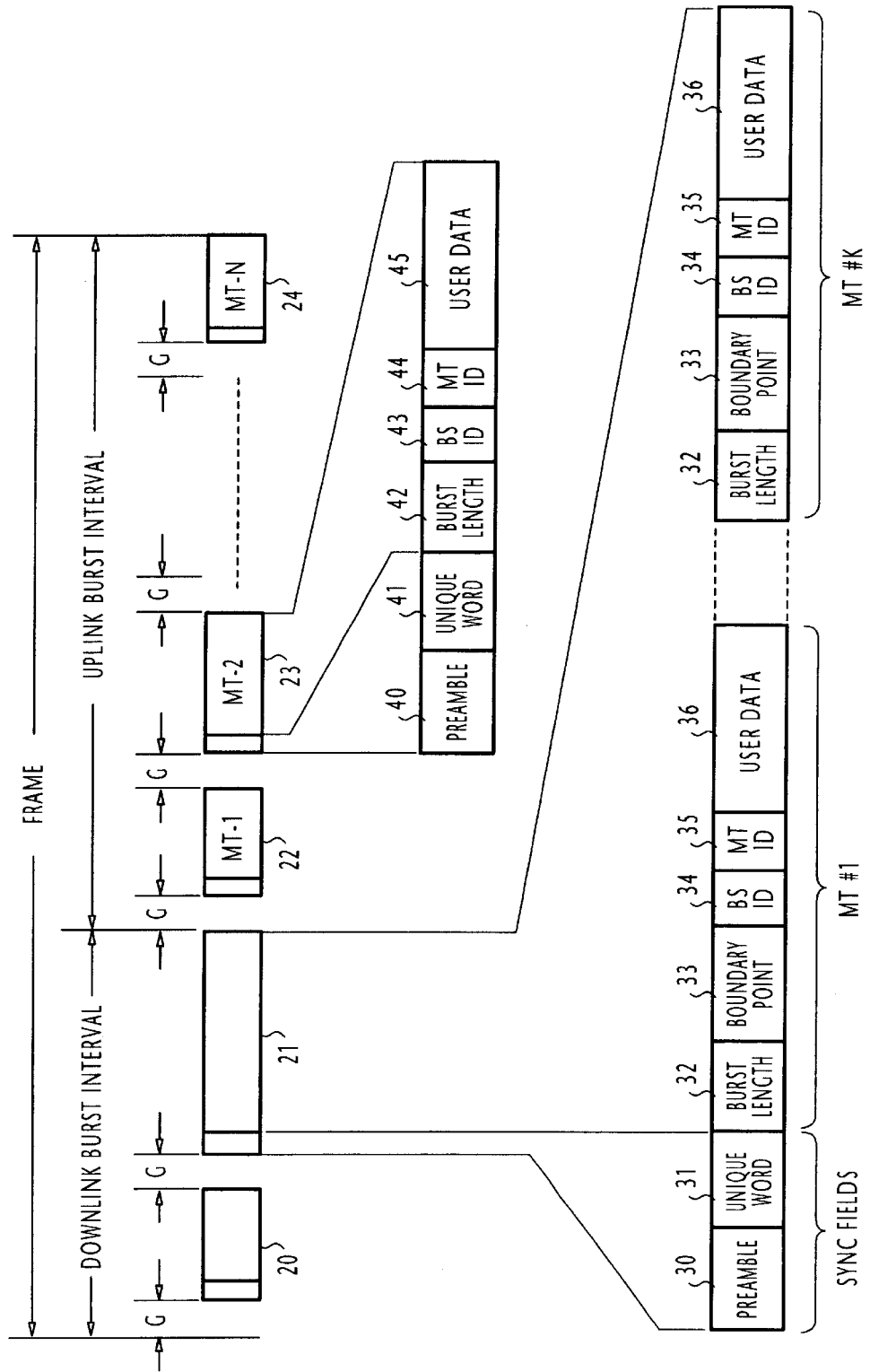
FIG. 2 shows a data structure of a frame according to the present invention.

The duplex timing of the transmit/receive switches 3 and 4 and the antenna selection of the antenna switch 19 are determined by the controller 12. Controller 12 determines the duplex timing of the switches 3 and 4 according to the total length of downlink bursts plus the total length of guard times between successive bursts. Controller 12 further determines the selection of the antennas 1 and 2 according to the antenna number retrieved from the memory 13 for a particular mobile terminal, so that the downlink RF bursts are transmitted from the antennas which are selected as the best antennas for the respective mobile terminals. This eliminates the need for each mobile terminal FIG. 2 shows the data structure of a frame according to the present invention.

As one example, downlink RF bursts 20 and 21 are transmitted by the base station during the downlink burst interval of a frame and a plurality of uplink RF bursts 22, 23, 24 are received during the uplink burst interval of the frame. Each downlink RF burst contains at the header portion of the burst a preamble 30 and a unique word 31 in order to allow destination mobile terminals to establish bit and frame timing synchronisation with the burst to receive subsequent data at correct timing. The unique word of each downlink RF burst is followed by at least one time slot signal. In the illustrated example, time slot signals MT#1 through MT#K are assembled into the same burst that is transmitted from a same antenna. Each time slot signal of an RF burst contains burst length data 32 for indicating the length of the RF burst and boundary point data 33 that indicates the boundary timing point between the downlink burst interval and the uplink burst interval. A base station identifier 34 and a mobile terminal identifier 35 (source and destination identifications) are inserted in the burst, followed by a user data field 36. Each uplink RF burst corresponds to each mobile terminal and includes a preamble 40 and a unique word 41 in order to allow the base station to establish bit and frame timing synchronisation with the uplink burst to receive subsequent data at correct timing. The unique word is followed by burst length data 42 for indicating the length of the uplink RF burst, a base station identifier 43 and a mobile terminal identifier 44 (source and destination identifications) and a user data field 45.

Figure 3:
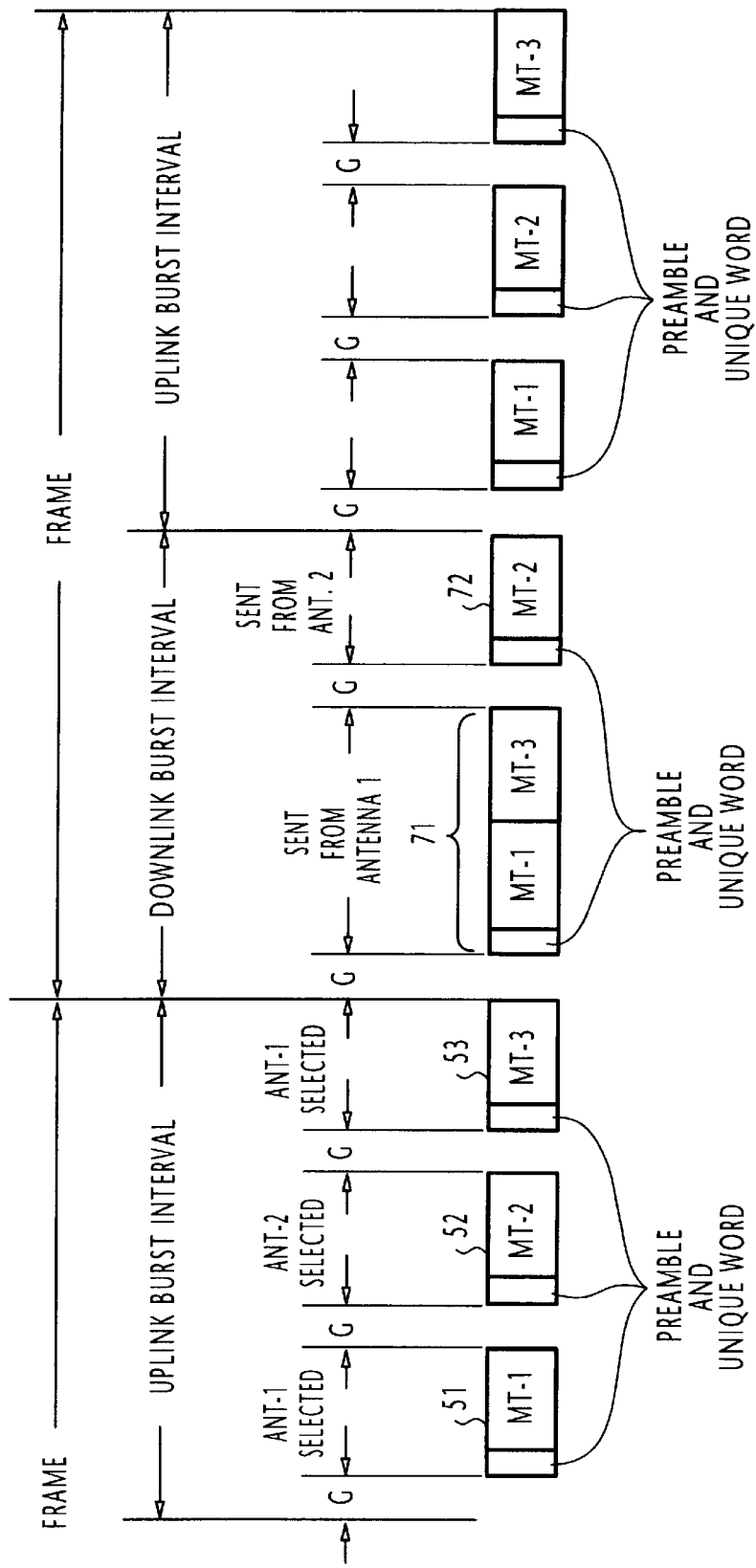
FIG. 3 shows an example data structure of a frame when two antennas are selected for transmission to three mobile terminals.

Assume that the base station is communicating with three mobile terminals MT-1, MT-2 and MT-3 and receiving TDMA signals 51, 52 and 53 during an uplink burst interval of a frame as shown in FIG. 3 and the best antennas stored in the mapping table memory 13 for these mobile terminals 18 are as shown in FIG. 4. When the base station receives a downlink TDM signal from the base station controller in which time slot data 61, 62 and 63 of these mobile terminals are multiplexed as shown in FIG. 5, the controller 12 extracts copies of the MT identifiers from these time slot data when they are disassembled in the slot data disassembler 14. Using the extracted MT identifiers, the controller 12 references the table memory 13 to read the stored antenna/mobile relationships and controls the burst data assembler 15 to assemble the time slot data 61 and 63 into a burst group (i.e., multicast group) #1 and the time slot data 62 as a burst group #2. The mapping data stored in the memory 13 indicates that the antenna 1 must be selected for the transmission of burst group #1 and the antenna 2 must be selected for the transmission of burst group #2.

The assembled data are supplied to the header insertion circuit 16. Controller 12 supplies the header information to the header insertion circuit to insert the preamble 30 and unique word 31 to the header portion of each burst group and inserts the burst length data 32, boundary point data 33 and the base station identifier 34 into each of the time slot data comprising the burst group.

The header-containing burst groups #1 and #2 are serially supplied to the modulator 17 and converted to downlink RF bursts 71 and 72 and transmitted from the antennas 1 and 2, respectively, as shown FIG. 3.

Mobile terminals MT-1, MT-2 and MT-3 are bit-synchronized to the transmitted RF bursts 71 and 72 using their preamble sequences and then frame-synchronized using their unique words. When frame synchronization is established, each mobile terminal proceeds to examine the mobile terminal identifier fields that follow. When each mobile terminal detects its address number in one of the MT fields, it reads the user data that immediately follows that MT field.

As a result, the RF burst transmitted from the antenna 1 is received by both mobile terminals MT-1 and MT-3. In this case, downlink transmission is in a multicast mode for a group of mobile terminals. Since only one preamble and only one unique word are necessary for each multicast downlink transmission and since it is not necessary to provide a guard time which would otherwise be required for "unicast" mode of transmission, the total amount of overhead time for downlink transmission is significantly reduced. The boundary point between downlink and uplink burst intervals of a frame can be made variable according to the total length of the downlink bursts. Thus, efficient utilization of network resource and hence high throughput transmit/receive diversity can be implemented. Because of the use of best antennas for the transmission of downlink signals, the mobile terminals are not required to operated in a diversity reception mode. Only one antenna and one front-end processing circuit are required for the mobile terminal.

What is claimed is:

1. A method of time division multiple access/time division duplex (TDMA/TDD) communication, comprising the steps of:

a) using a plurality of space diversity antennas during an uplink interval of a frame to receive a plurality of RF bursts each containing a series of TDMA signals respectively identified by mobile-terminal identifiers;

b) detecting, from each RF burst, the respective strength values of the TDMA signals of the RF burst;

c) comparing the respective strength values of each RF burst with the corresponding strength values of other RF bursts;

d) selecting, for each mobile-terminal identifier, one of said antennas from which the TDMA signal of highest strength value is received and establishing a unique relationship between the selected antenna and the mobile-terminal identifier in a memory;

e) disassembling a downlink TDM signal into a plurality of time-slot signals and assembling the time-slot signals into N burst groups each containing at least one time-slot signal according to unique relationships established in said memory, where the integer N is equal to the number of antennas selected by step (d) during said uplink interval;

f) appending an overhead to a header portion of each of said burst groups; and g) converting said N burst groups into downlink RF bursts during a downlink interval of said frame and transmitting the RF bursts from the antennas respectively selected by step (d).

2. The method of claim 1, wherein each of said burst groups contains information indicating the length of the burst group and the boundary point between the downlink and uplink burst intervals of the frame.

3. The method of claim 2, further comprising the step of complementarily varying said uplink and downlink intervals of said frame according to total length of said N burst groups assembled during the downlink interval of said frame.

4. The method of claim 1, further comprising the step of complementarily varying said uplink and downlink intervals of said frame according to total length of said N burst groups assembled during the downlink interval of said frame.

5. The method according to claim 1, wherein said downlink RF bursts are transmitted simultaneously from the N antennas respectively selected at step (d).

6. A time division multiple access/time division duplex (TDMA/TDD) communication system comprising:

a plurality of space diversity antennas;

a plurality of transmit/receive switches connected to the antennas for alternately operating the system in a receive mode during an uplink interval of a frame and in a transmit mode during a downlink interval of the frame;

a plurality of RF receiving circuits associated with said plurality of transmit/receive switches for receiving a plurality of uplink RF bursts each containing a series of TDMA signals respectively identified by mobile-terminal identifiers and producing a plurality of strength indication signals representing the respective strength values of the TDMA signals of each uplink RF burst;

receive diversity circuitry for comparing the respective strength values of each RF burst with the corresponding strength values of other RF bursts and selecting, for each mobile-terminal identifier, one of the antennas from which the TDMA signal of highest strength value is received;

transmit diversity circuitry, having a memory, for establishing in said memory, a unique relationship between the selected antenna and each of said mobile-terminal identifiers, disassembling a downlink TDM signal into a plurality of time-slot signals and assembling the time-slot signals into N burst groups each containing at least one time-slot signal according to relationships established in said memory, and appending an overhead to a header portion of each of the N burst groups, where the integer N is equal to the number of antennas selected by the receive diversity circuitry during said uplink interval; and RF transmitting circuitry for converting said N burst groups into downlink RF bursts and transmitting the RF bursts respectively from the antennas selected by the receive diversity circuitry.

7. The system of claim 6, wherein each of said burst groups contains information indicating the length of the burst group and the boundary point between the downlink and uplink burst intervals of the frame.

8. The system of claim 7, further comprising means for controlling said plurality of transmit/receive switches to operate the system in said transmit and receive modes according to total length of said N burst groups assembled during the downlink interval of said frame.

9. The system of claim 6, further comprising means for controlling said plurality of transmit/receive switches to operate the system in said transmit and receive modes according to total length of said N burst groups assembled during the downlink interval of said frame.

* * * * *